Sept. 1, 1925.  
H. DAU  
1,552,121  
INCANDESCENT ELECTRIC LAMP  
Filed April 12, 1923  2 Sheets-Sheet 1

Inventor,  
Hans Dau  
by Geyer & Popp  
Attorneys.

Sept. 1, 1925.  
H. DAU  
INCANDESCENT ELECTRIC LAMP  
Filed April 12, 1923   2 Sheets-Sheet 2  
1,552,121
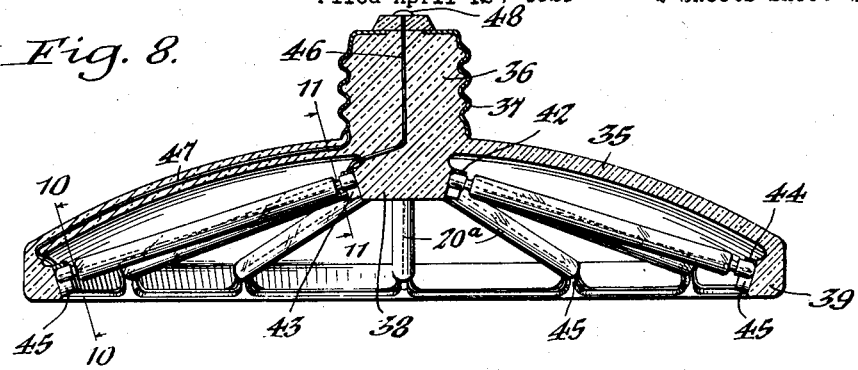
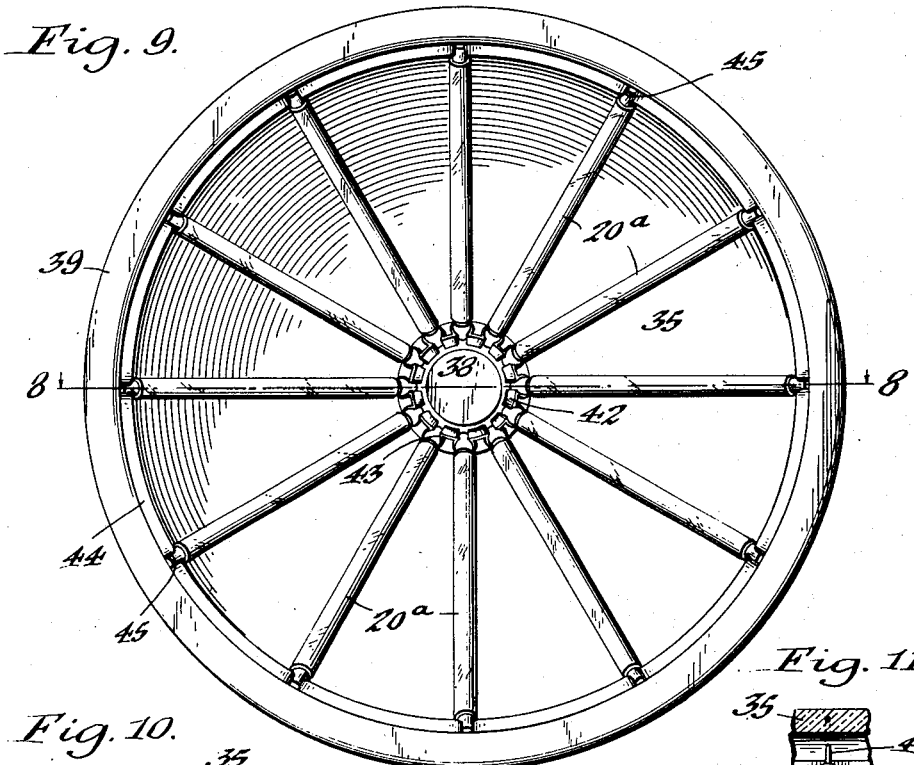
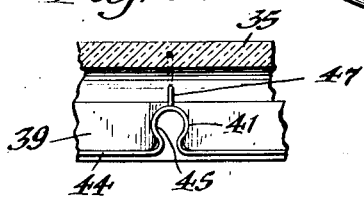
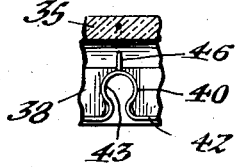
Inventor,
Hans Dau
by Emer Gobb
Attorneys.

Patented Sept. 1, 1925.

1,552,121

UNITED STATES PATENT OFFICE.

HANS DAU, OF INNSBRUCK, AUSTRIA, ASSIGNOR, BY DIRECT AND MESNE ASSIGNMENTS, OF ONE-HALF TO MARY KERTZ AND ONE-HALF TO JOHN G. SATTLER, BOTH OF BUFFALO, NEW YORK.

INCANDESCENT ELECTRIC LAMP.

Application filed April 12, 1923. Serial No. 631,724.

*To all whom it may concern:*

Be it known that I, HANS DAU, a citizen of the Republic of Austria, residing at Innsbruck, in the Republic of Austria, have invented new and useful Improvements in Incandescent Electric Lamps, of which the following is a specification.

This invention relates to improvements in incandescent electric lamps having lighting units or filament tubes which are individually replaceable in case of breakage or when burnt out, so that the remainder of the lamp need not be discarded but can be used until worn out.

The object of the invention is the improvement of the holding devices of the removable lighting units, with a view of reducing their cost, reliably keeping the units in place and at the same time producing a sightly lamp.

Figure 1:
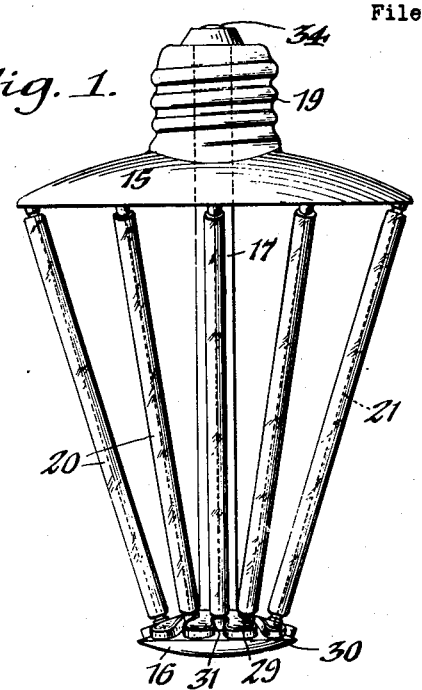
Figure 2:
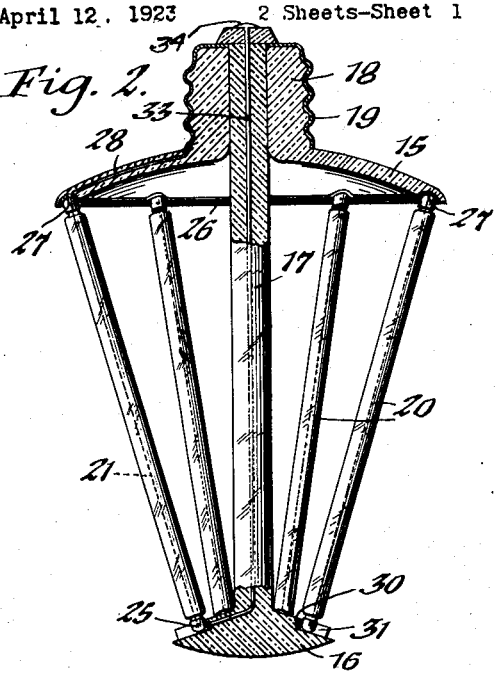
Figure 3:
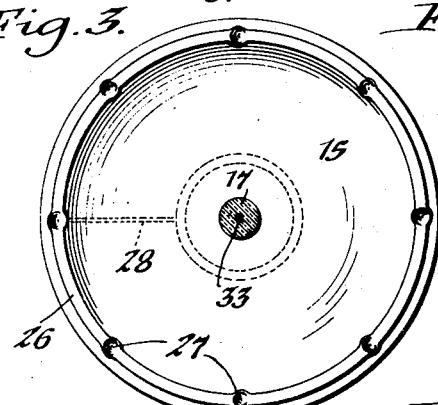
Figure 4:
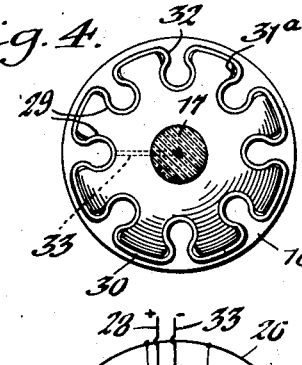
Figure 5:
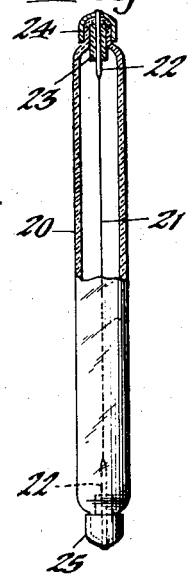
Figure 6:
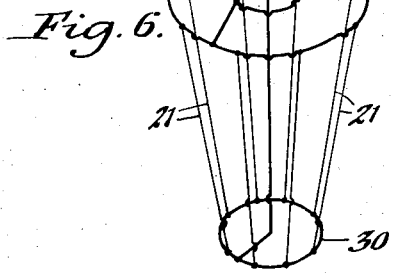
Figure 7:
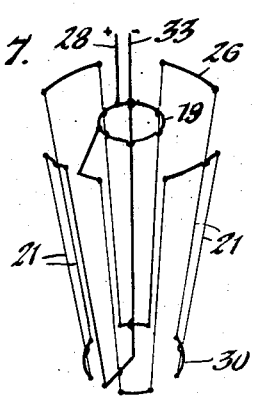

In the accompanying drawings: Figure 1 is a side elevation of an electric lamp embodying one form of my improvement. Figure 2 is a central vertical section thereof. Figure 3 is a sectional bottom plan view of the inner or upper head of the lamp. Figure 4 is an enlarged sectional top plan view of the base of the lamp. Figure 5 is an enlarged sectional elevation of one of the filament tubes. Figure 6 is a diagrammatic view of the lamp circuit shown in parallel. Figure 7 is a similar view, showing the lamp circuit in series. Figure 8 is a transverse vertical section on line 8—8, Fig. 9, showing a modified form of the improvement. Figure 9 is a bottom plan view thereof. Figures 10 and 11 are enlarged fragmentary cross sections on the correspondingly numbered lines in Fig. 8.

Similar characters of reference indicate corresponding parts throughout the several views.

In the preferred embodiment of the invention shown in Figs. 1–6, inclusive, the same comprises a globeless or bulbless lamp body including an upper head 15 of substantially dome shape, a lower head 16 and a central stem or post 17 rigidly connecting said heads. This stem is preferably integral with the lower head, and the upper head is provided centrally of its top with a hollow attaching neck or plug 18 in which the upper end of the stem is suitably secured. Said upper and lower heads are made of glass or similar insulating material, the neck 18 of the upper head having a threaded metallic sleeve 19 which constitutes one of the lamp terminals and which is adapted to screw into a customary lamp socket.

Supported between the opposing upper and lower heads 15 and 16, are a plurality of individually removable incandescent lighting units or tubes 20. As shown in Fig. 5, each of these tubes, from which the air has been exhausted, is preferably constructed of glass, and mounted centrally within the same is a filament 21 of carbon, tungsten or other appropriate material. The ends of this filament are joined to conductor wires 22 mounted in insulating plugs 23 securely held and sealed in the corresponding ends of said tube. Metallic caps 24, 25 are cemented or otherwise attached to the upper and lower ends of the filament tube and the outer ends of the respective conductor wires are joined thereto.

By preference the devices for removably retaining the filament-tube in place are in the form of elastic holders, and for this purpose, the upper head is provided on its underside near its outer edge with an annular conductor band or ring 26 having sockets or depressions 27 formed therein. In the drawings, eight of these sockets are shown, but any other number of them may be employed, depending on the number of filament tubes it is desired to use for a given lamp or the fancy of the designer. This conductor band is electrically connected by a wire 28 with the terminal sleeve 19 of the upper lamp body. The lower head is provided in its upper side with an annular row of outwardly opening seats or recesses 29 alined with and corresponding in number to the sockets in the upper head. Lining these recesses and extending back and forth around the adjoining portions of this head is a continuous conductor band 30. The looped portions 31 of this band lying within the recesses 29 form sockets which are of the proper diameter to snugly receive the lower caps 25 of the filament tubes, so as to insure good electrical contact therewith, while the contracted throats 32 leading to said sockets 31 are of such a size as to permit the filament tubes to be sprung into place and yet prevent accidental outward displacement thereof. For this purpose, the parts of the band forming these throats are normally spaced from the walls of the recesses, as shown at 31ª in Fig. 4.

The lower conductor band 30 is included in the lamp circuit, a wire 33 being connected therewith which extends upwardly through the post 18 and neck 17 to the other lamp terminal 34, the latter being insulated in the usual manner from the top of the sleeve 19.

In inserting a tube in place between the heads of the lamp body, the upper end of the tube is first fitted into the respective socket 27 in the upper conductor band after which it is swung inwardly and sprung into the corresponding socket 31 of the lower conductor band. The removal of a tube is readily effected by reversing this operation.

In the arrangement of the parts thus far described, the filament tubes are arranged in parallel with the upper and lower conductor bands 26 and 30, respectively, the complete circuit being shown diagrammatically in Fig. 6. If desired, the tubes may be arranged in series, as shown diagrammatically in Fig. 7. The parallel arrangement has the advantage over the series arrangement that when a tube is burnt out, such defective tube is easily detected and the remainder of the lighting circuit is not affected.

The invention may obviously be modified in various ways within the scope of the appended claim, and I do not therefore wish to be limited to the particular embodiments herein disclosed. For example, in the modification of the improvement shown in Figs. 8–11 inclusive, the lower head and connecting post are dispensed with, and the filament tubes 20ª are wholly mounted on the underside of a dome or shade 35 constructed of glass or other similar material. This dome is provided centrally of its top with a neck 36 having a threaded metallic sleeve 37 which forms one of the lamp terminals and which is adapted to enter the customary lamp socket. Depending centrally from the underside of the dome is a boss or supporting head 38 and near its outer edge said dome is provided with a depending annular flange 39. The latter and the head 38 form inner and outer supports for the filament tubes 20ª which are arranged radially within the dome, as shown in Fig. 9. The opposing faces of said head and said flange are provided with downwardly-opening recesses 40 and 41, respectively, similar to the recesses 29 of the lower head 16 of the previously described construction. A conductor band 42 surrounds the head 38 and is formed into yieldable sockets 43 which register with the recesses 40 for supporting the inner ends of the filament tubes, while a conductor band 44 is applied to the flange 39 and formed into similar sockets 45 which register with the recesses 41 for supporting the outer ends of the filament tubes. The conductor bands 42, 44 are included in the lamp circuit, being connected by wires 46 and 47 which lead to the terminal 48 at the top of the neck 36 and to the terminal sleeve 37, respectively. In the example shown, the filament tubes are arranged in parallel with the conductor bands. The insertion and removal of the tubes is effected by simply springing them into and out of the sockets 43, 45.

It will be noted that the socketed tube-retaining bands 26 and 30, are arranged within the outer edges or dimensional lines of the upper and lower heads of the lamp shown in Figs. 1–7, inclusive, and that the corresponding bands 42 and 44 of the lamp illustrated in the remaining figures are likewise arranged within the dimensional lines of the shade 35. This arrangement, by avoiding the use of projecting parts at the edges of the heads and the shade, improves the appearance of the lamp and at the same time permits convenient insertion and removal of the tubes.

I claim as my invention:

An incandescent lamp, comprising an upper head and a lower head arranged in spaced relation and connected by a substantially central post, the lower head being provided with outwardly opening recesses, continuous conductor-bands applied to said upper and lower heads within their dimensional lines, said upper band having sockets formed therein, the lower band having looped portions registering with the recesses in said lower head and forming lower sockets, and a plurality of individual filament-tubes arranged about said central post and removably seated in said upper and lower sets of sockets.

HANS DAU.